United States Patent
Varney

(10) Patent No.: US 7,621,175 B2
(45) Date of Patent: Nov. 24, 2009

(54) MONITORING OF A CAM PROFILE SWITCHING SYSTEM IN INTERNAL COMBUSTION ENGINES

(75) Inventor: Brian Anthony Varney, Southam (GB)

(73) Assignees: Ford Global Technologies, LLC, Dearborn, MI (US); Jaguar Cars Limited, Coventry (GB)

( * ) Notice: Subject to any disclaimer, the term of this patent is extended or adjusted under 35 U.S.C. 154(b) by 97 days.

(21) Appl. No.: 11/832,688

(22) Filed: Aug. 2, 2007

(65) Prior Publication Data

US 2008/0028844 A1    Feb. 7, 2008

(30) Foreign Application Priority Data

Aug. 5, 2006   (GB) .................................. 0615574.1

(51) Int. Cl.
    *G01M 15/10*   (2006.01)
(52) U.S. Cl. .................................................. 73/114.79
(58) Field of Classification Search .............. 73/114.69, 73/114.71, 114.72, 114.73, 114.77, 114.79
    See application file for complete search history.

(56) References Cited

U.S. PATENT DOCUMENTS

| | | | |
|---|---|---|---|
| 6,213,068 B1 | 4/2001 | Hassdenteufel | |
| 7,146,851 B2 * | 12/2006 | Wakahara et al. | ......... 73/114.72 |
| 7,387,018 B2 * | 6/2008 | Wiles | ...................... 73/114.39 |
| 7,444,236 B2 * | 10/2008 | Wiles | .......................... 701/114 |
| 2004/0093148 A1 * | 5/2004 | Buckland et al. | ............ 701/102 |
| 2005/0204805 A1 | 9/2005 | Wakahara et al. | |

* cited by examiner

*Primary Examiner*—Eric S McCall
(74) *Attorney, Agent, or Firm*—Allan J. Lippa; Alleman Hall McCoy Russell & Tuttle LLP

(57) ABSTRACT

A method and apparatus for detecting degradation in the cam profile switching system in either bank 2, 3 of a V-engine 1 relies on a comparison of the lambda values in each exhaust bank 4, 5 immediately prior to and subsequent to a cam profile switching event in one of the banks. If there is little or no change after switching, then the apparatus deduces that the switched bank has experienced degradation. The method is easy to calibrate and does not require continuous monitoring of engine behavior.

15 Claims, 2 Drawing Sheets

MONITORING OF A CAM PROFILE SWITCHING SYSTEM IN INTERNAL COMBUSTION ENGINES

FIELD

The present description relates to a method for monitoring switching of a cam profile changing device for an internal combustion engine.

BACKGROUND AND SUMMARY

It is known in an internal combustion engine to employ cam profile switching (CPS) to enhance engine fuel economy at low engine speeds whilst ensuring increased maximum power at high engine speeds. Switching between two different cam profiles permits an engine to operate with small inlet valve lift at relatively low engine speeds and a larger inlet valve lift at relatively high engine speeds.

Any degradation of the CPS system may cause an effect on tailpipe emissions and as such there is a legislative requirement that the engine management system (EMS) monitors the performance of the CPS system and reports any system degradation to the driver.

U.S. Patent application 2005/0204805 and U.S. Pat. No. 6,213,068 describe methods which make use of exhaust air-fuel ratio (AFR) as a means of detecting correct system operation. U.S. 2005/0204805 discloses a system that continuously assesses the AFR and attributes an AFR at a given time period with a specific cylinder. It determines that a degradation exists if the AFR of a specific cylinder departs from that which would be anticipated for it, e.g., if its value is significantly different from others.

The system disclosed in U.S. Pat No. 6,213,068 continuously monitors inlet air flow (mass and pressure) and compares these values against values anticipated from algorithms based on engine speed and throttle position. If degradation is perceived then bank fuelling compensation values are considered in order to identify which bank is likely to have degraded.

These known methods allow for the detection of a single tappet degradation but may be unreliable and/or difficult to calibrate and may be insensitive to multiple tappet degradations. A monitor that will only detect bank degradation would be simpler and therefore potentially more reliable and easier to calibrate.

A typical CPS system comprises a variable lift tappet on each inlet valve of each cylinder (two per cylinder). A tappet will operate on the high lift cam profile if high pressure oil feed is supplied to the side of the tappet. Therefore, a CPS system also includes electronically-activated solenoid switches which, when actuated, will supply oil pressure to all tappets. On engines having a V configuration, one solenoid per bank is provided.

Automobile engines with a V layout are usually equipped with one exhaust pipe per bank. Each exhaust bank has its own air-fuel ratio sensor. Fueling is independently controlled in each bank to ensure that lambda is maintained near to a value of 1 in order to ensure efficient exhaust catalyst performance and thus efficient tailpipe emissions. At certain engine operating conditions i.e. certain engine speed, load, variable valve timing settings, a change in the cam profile switching position from one setting to another will cause a change in the air flowing through the engine. If the cam profile switching position is switched on one bank alone, one bank will accept less air than it did prior to the switch and the other, more air than it did prior to the switch. As a result, a cam profile switching event can manifest itself as a deflection in the air-fuel ratio of each bank.

There is typically a time lag between initiation of a cam profile change, (i.e. applying a switching signal to a solenoid switch) and a resulting change in the air-fuel ratio of either exhaust bank. This is because of the air induction and combustion process. That is, the change in cam profile initially restricts the intake air flow into the switched bank (and therefore increases it in the other bank). This altered intake air quantity will take a finite time to progress through the cylinders and combustion process before being exhausted and causing a fluctuation in the air-fuel ratio readings.

Hence, once a switching signal has been applied to the solenoids, it can be anticipated that at some later stage a deflection in the air-fuel ratio will ensue, provided that the switching process is functioning as desired. However, if there is degradation and the application of the signal to the solenoid switches does not result in a switch to a different cam profile, then there will be no anticipated deflection measurable in the exhaust air-fuel ratio.

According to a first aspect, the description consists of a method for detecting degradation in a cam profile switching system of an internal combustion engine having a first cylinder bank and a second cylinder bank, the method comprising: indicating degradation of a cam profile switching device as the output of a first sensor located in the exhaust path of said first cylinder bank varies from the output of a second sensor located in the exhaust path of said second cylinder bank.

Hence, if the relationship between the air-fuel ratios of each bank remains substantially unchanged after a cam profile switching signal has been applied, then this indicates that the switching process must have been unsuccessful.

According to a second aspect, the description consists of a method for detecting a degradation in a cam profile switching system of an internal combustion engine having a plurality of cylinder banks, each cylinder bank being associated with an exhaust bank, wherein each exhaust bank is equipped with a sensor for monitoring air-fuel ratio, the method including the steps of; applying a cam profile switching signal to a first cylinder bank, prior to an anticipated cam profile switching event on said first cylinder bank, taking a first reading of air-fuel ratio values in each exhaust bank and computing a first relationship X1 between the values, subsequent to the anticipated cam profile switching event on said first cylinder bank, taking a second reading of air-fuel ratio values in each exhaust bank and computing a second relationship X2 between the values, computing a third relationship X3 between X1 and X2, comparing X3 with a predetermined range and if X3 falls within the predetermined range, deducing that a degradation exists in the cam profile switching system of the first cylinder bank and generating a degradation signal.

If X3 falls outside the predetermined range, then this indicates that the cam profile switching system of the switched bank is functioning correctly.

The relationships X1, X2, X3 between values may be a ratio, for example, or may be a difference.

The description has the advantage over the known systems mentioned above in that detection of cam profile switching degradation is reliant only upon lambda sensor differences and not dependent on a problem also being identified with air-flow. Further, it only requires that the assessment takes place across cam profile switching events. In contrast, known systems require continuous monitoring. The description is thus more robust and easier to calibrate than other known systems. The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
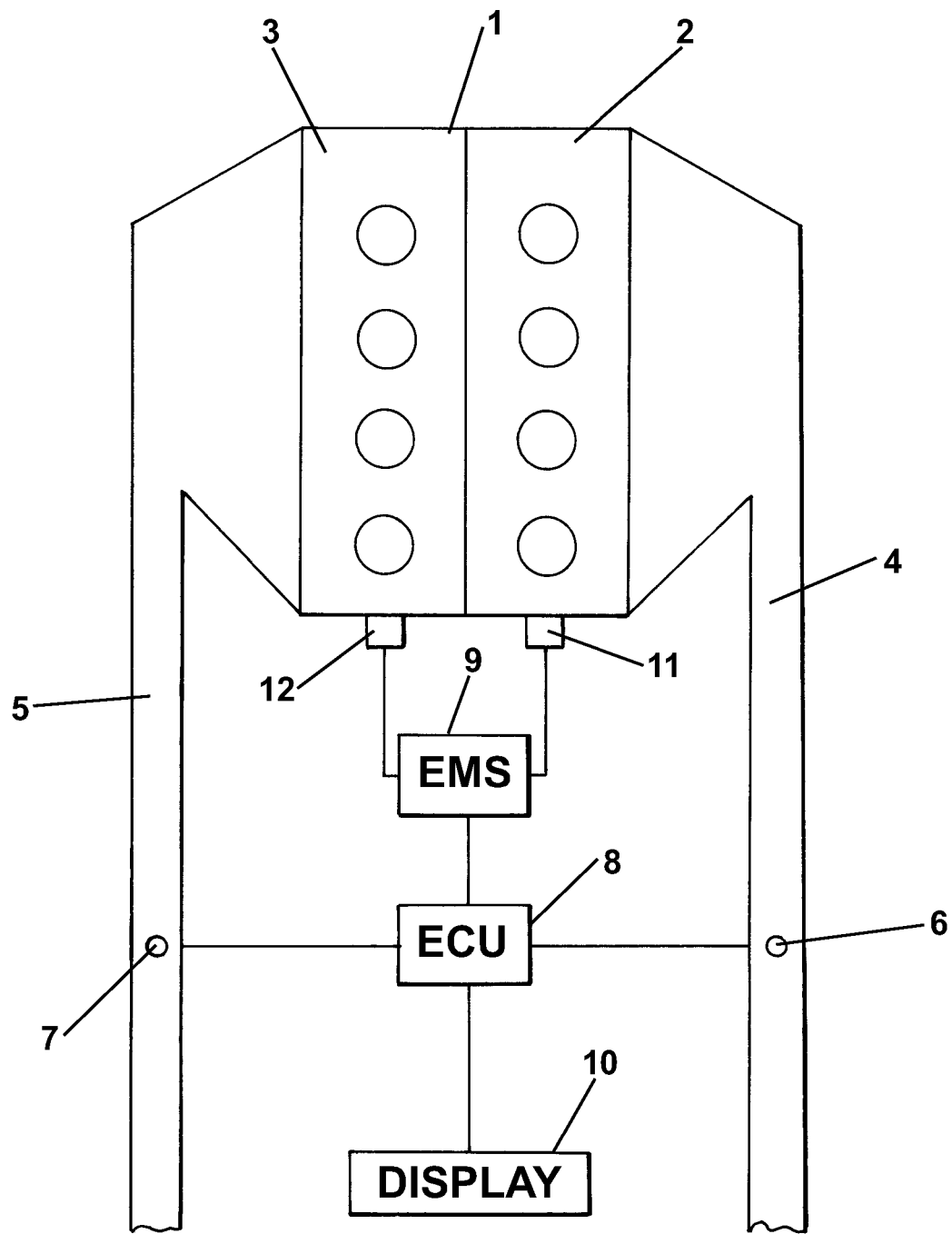
FIG. 1 is a schematic diagram of an internal combustion engine and associated exhaust system incorporating degradation detection apparatus in accordance with a first embodiment of the description.

With reference to FIG. 1, a vehicle (not shown) is fitted with an internal combustion engine 1 which has two cylinder banks 2, 3 in a V formation. Each cylinder bank 2, 3 is connected to a respective exhaust bank 4, 5 and in each exhaust bank is located a lambda sensor 6, 7. The lambda sensors 6, 7 have outputs which are connected to an electronic control unit (ECU) 8. The ECU 8 has two outputs, one of which is connected to an engine management system (EMS) module 9 and another which is connected to a visual display unit 10 which is mounted in the instrument panel of the vehicle.

Two solenoid switches 11, 12 are located on each cylinder bank 2, 3 and connected to the EMS 9.

The engine 1 incorporates a conventional cam profile switching (CPS) arrangement. Switching between cam profiles is done by switching oil pressure on and off in oil galleries in both cylinder banks 2, 3. Oil pressure is supplied by switching on and off the voltage to the solenoid switches 11, 12. Switching from one cam profile to the other on either cylinder bank 2, 3 is initiated by a signal from the EMS 9 to either solenoid 11, 12 and under the control of the ECU 8.

The ECU 8 also monitors the lambda sensor outputs and from these readings determines if degradation exists in the CPS mechanism in one or both of the two cylinder banks 2, 3.

During engine operation, CPS switching events are controlled to ensure that for a defined time period one cylinder bank is held at a different CPS position relative to the other. This difference may occur during a normal engine switching event or may be caused by a diagnostic test routine initiated by the ECU 9 at optimum engine conditions. The choice as to which bank is switched or which bank is switched first may be alternated between switching events.

The relationship of the outputs from the lambda sensors 6, 7 in one bank to the other, measured across a time period prior to a monitored switching event, is recorded as the value X1. The relationship measured during the period immediately following the monitored switching event and while the CPS system on one bank is held at a different position compared with the other, is recorded as X2. If the relationship between X1 and X2 falls outside a predetermined range, the correct operation of the switched bank is confirmed. Conversely, the failure of the relationship to fall outside a predetermined range is identified as degradation of the switched CPS system.

Figure 2:
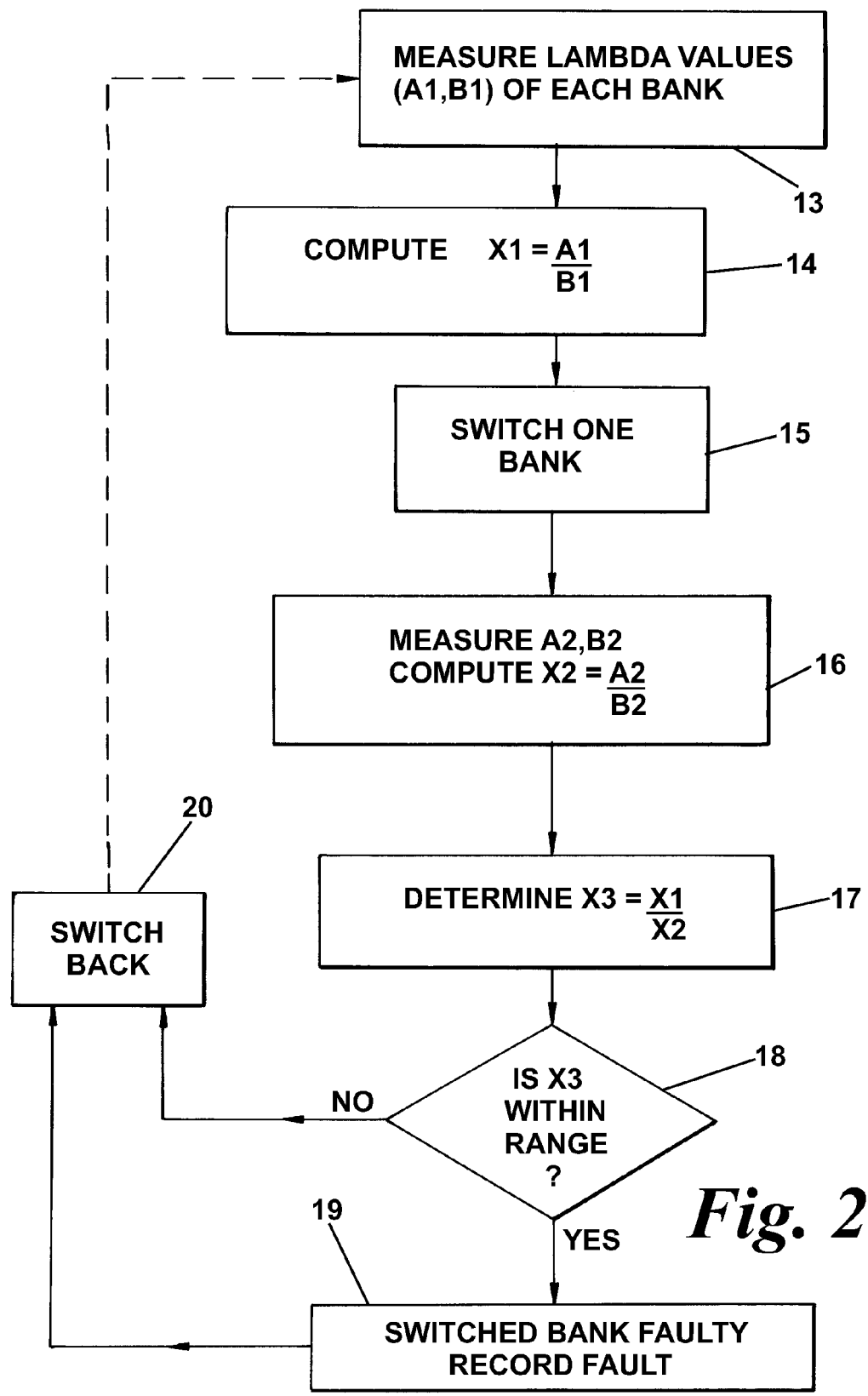
FIG. 2 is a flowchart illustrating the operation of the apparatus of FIG. 1.

Operation of the apparatus of FIG. 1 will now be described in greater detail with reference to FIG. 2.

At step 13, the lambda values A1, B1 of each cylinder bank are measured and the ratio X1=A1/B1 is calculated and stored (step 14).

At step 15, the cam profile switching signal is sent to one of the two cylinder banks.

At step 16, the lambda values A2, B2 of each cylinder bank are measured again and the ratio X2=A2/B2 of these values is calculated.

At step 17, the ratio X3=X1/X2 is determined.

At step 18, X3 is compared with a predetermined range and if X3 falls within this range then this signifies that the switched bank has degradation and the degradation is logged into the EMS and a warning light is illuminated on the vehicle's instrument panel (step 19).

If X3 falls outside the predetermined range, then this signifies that there is no degradation on the switched bank.

At step 20, the previously switched bank is switched back to its original state and the process is repeated for the other bank.

In an alternative embodiment, the EMS 10 operates a conventional closed loop lambda control system for each cylinder bank.

Instead of monitoring the lambda values of each exhaust bank, the ECU 9 monitors the lambda correction values for each bank, works out a relationship X1 between the values prior to a switching event, computes a relationship X2 between the same values subsequent to the switching event, then determines a third relationship X3, between X1 and X2.

If X3 is found to fall within a predetermined range, then the ECU deduces that degradation exists in the CPS system of the switched bank. A degradation signal is then logged by the EMS 10 and displayed on the instrument panel.

As in the embodiment described above with reference to FIG. 2, the relationships computed may be ratios. Alternatively, the relationships can be a difference between two values.

In a preferred embodiment, the sensors for monitoring air-fuel ratio may be lambda sensors. The output of such sensors is a value which is equal to the actual air-fuel ratio divided by the stoichiometric air-fuel ratio. (The stoichiometric AFR defines the minimum theoretical mass of air necessary for complete combustion).

The description can be embodied as a monitor which operates by causing the deliberate switching of cam profile on one bank and assessing a change in the relationship of the output from one bank's lambda sensor to the other, which results from the switching process. It is possible to confirm that the cam profile switching system of each bank is operating correctly by switching each bank in turn.

In one preferred embodiment, and in order to ensure that the operation of the monitor is imperceptible to the driver, the switching test may be limited to take place only when engine load is near to zero and when engine speed is greater than idle. Also, each cam profile switching system may be held at the new switched position only for a fraction of a second before being returned to the original condition.

In general, in order to minimize driver disturbance, the degradation detection process should be initiated under one or more of the following conditions; engine torque is very low or negative, engine speed is transient, engine speed is within identified minimum and maximum range, accelerator pedal displacement is low and has recently gone low, the vehicle is moving, a pre-set time period has elapsed since last operation, a degradation/no degradation operation has not yet been confirmed for the current drive cycle or any preset rate based-monitoring requirements have not been met.

Further, to minimize tailpipe emissions, it is preferable for the degradation detection process to be carried out only after the engine has been running for a specified time period or after the engine coolant temperature is higher than a defined value or after the exhaust system catalysts have lit off.

To ensure robust operation, it is preferred that the degradation detection process is operated when at least one of the following conditions is fulfilled; the engine is initially in CPS low lift condition, oil temperature is within preset limits, variable valve timing target angle is within set limits, engine is not in fuel-cut mode, variable valve timing closed loop fuelling and misfire control is degradation free, no other intrusive on-board diagnostic checks are being carried out.

In one example of the description, the normal cam position switching process of the engine may be defined such that the switching of each bank occurs consecutively within a short time period between the switching of each. The monitor then assesses the change in the relationship of the output from one bank's lambda sensor to the other which results from each of the two switching events.

Although particularly applicable for V layout engines, the description may also be used on a suitably equipped in-line engine i.e. an engine which has two separate cam profile switching systems ganged to separate exhausts each with its own lambda sensor.

Preferably, the air-fuel ratio measurements are made immediately prior to a cam profile switching event and immediately afterwards. This permits the greatest sensitivity and accuracy of the degradation detection process.

Because of the time lag between initiation of a cam profile change and a change in the AFR of either bank, under certain engine operating conditions, it may be possible to take the first measurement after the switching signal has been applied.

A typical V configuration engine has a closed loop lambda control for each bank. In such cases, the second reading of air-fuel ratio values in each bank are preferably made before the lambda control loops have had a chance to alter the fuel supplies to each cylinder bank in order to compensate for any cross-bank mismatch in air-fuel ratio readings, the mismatch having been imposed by the cam profile switching process.

In an alternative embodiment of the description, the relationship of the correction values for a closed loop lambda control of each cylinder bank may be used instead of the air-fuel ratio sensor or lambda sensor readings in order to detect degradation in the CPS system.

In a further embodiment, measurements from both AFR (or lambda) sensors and the lambda control loops are utilized. These two sets of readings can be combined in advantageous ways in order to enhance the sensitivity of the degradation detection process.

The generated degradation signal may be used to illuminate a warning light on the instrument panel of a vehicle so that the driver is informed. The degradation signal may also be fed to an on-board engine management system so that it may be stored for future use in any engine diagnostic procedure.

This concludes the description. The reading of it by those skilled in the art would bring to mind many alterations and modifications without departing from the spirit and the scope of the description.

The invention claimed is:

1. A system for detecting degradation in a cam profile switching system of an internal combustion engine having a plurality of cylinder banks, the system comprising:
    at least a cam profile switching system;
    an engine having a first and second cylinder bank, each cylinder bank having an exhaust pipe coupled thereto;
    a first sensor placed in the exhaust path of said first cylinder bank and a second sensor placed in the exhaust path of said second cylinder bank; and
    a controller for monitoring the output of said first sensor and the output of said second sensor and providing an indication of degradation of said at least a cam profile switching system in response to a comparison of said output of said first sensor and of said output of said second sensor.

2. The system of claim 1 wherein the air-fuel ratio of cylinders of said first cylinder bank is determined from the output of said first sensor and wherein the air-fuel ratio of cylinders of said second cylinder bank is determined from the output of said second sensor.

3. The system of claim 1 wherein said comparison is comprised of subtracting the output of either of said first and second sensors from the other of either of said first and second sensors.

4. The system of claim 1 wherein said comparison is comprised of producing a ratio between the outputs of said first sensor and said second sensor.

5. The system of claim 1 further comprising said controller displaying an indication of said degradation.

6. A method for detecting degradation in a cam profile switching system of an internal combustion engine having a first cylinder bank and a second cylinder bank, the method comprising:
    indicating degradation of the cam profile switching system as the output of a first sensor located in the exhaust path of said first cylinder bank varies from the output of a second sensor located in the exhaust path of said second cylinder bank.

7. The method of claim 6 further comprising making a comparison between the output of said first sensor and the output of said second sensor.

8. The method of claim 7 wherein said comparison comprises determining a difference between the output of said first sensor and the output of said second sensor.

9. The method of claim 7 wherein said comparison comprises determining a ratio between the output of said first sensor and the output of said second sensor.

10. The method of claim 6 wherein said first sensor and said second sensor are used to determine cylinder air-fuel ratio of said first and said second cylinder banks.

11. The method of claim 6 further comprising holding the a first cylinder bank cam profile switching system at a different position than a second cylinder bank cam profile switching system.

12. A method for detecting degradation in a cam profile switching system of an internal combustion engine having a first cylinder bank and a second cylinder bank, the method comprising:
    applying a switching signal to a cam profile switching system of said first cylinder bank; and
    indicating degradation of said cam profile switching system if the air-fuel ratios of said first cylinder bank and said second cylinder bank remain substantially unchanged after applying said switching signal.

13. The method of claim 12 further comprising making a comparison between the output of said first sensor and the output of said second sensor.

14. The method of claim 13 wherein said comparison comprises determining a difference between the output of said first sensor and the output of said second sensor.

15. The method of claim 13 wherein said comparison comprises determining a ratio between the output of said first sensor and the output of said second sensor.

* * * * *